No. 759,041. PATENTED MAY 3, 1904.
S. B. STORER.
MAGNETIC SPEED INDICATOR.
APPLICATION FILED APR. 16, 1903.
NO MODEL.
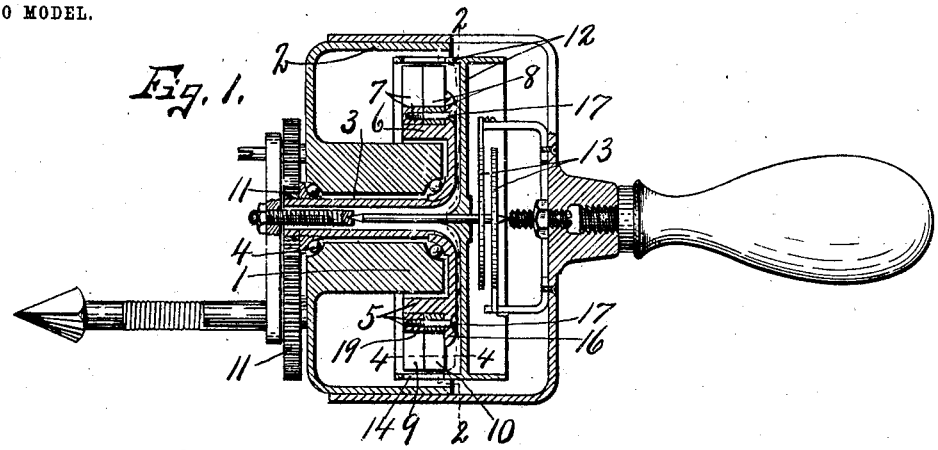
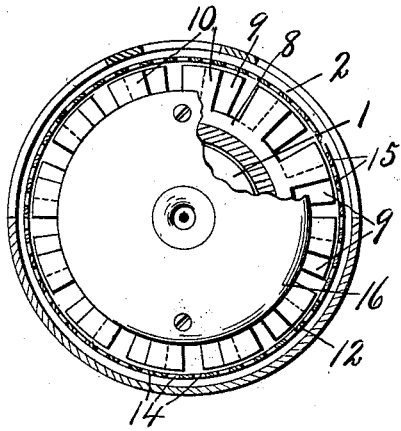
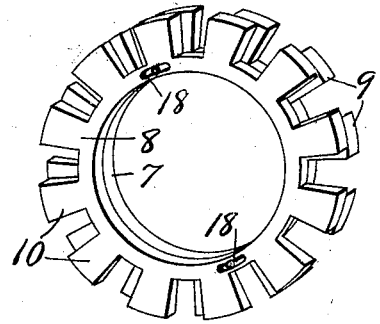
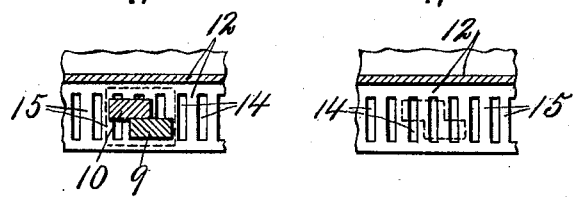
Witnesses:
W. S. Brewer
H. C. Chase
Inventor
Simon B. Storer
By Howard P. Denison
Attorney No. 759,041. Patented May 3, 1904.

UNITED STATES PATENT OFFICE.

SIMON B. STORER, OF SYRACUSE, NEW YORK.

MAGNETIC SPEED-INDICATOR.

SPECIFICATION forming part of Letters Patent No. 759,041, dated May 3, 1904.

Application filed April 16, 1903. Serial No. 152,884. (No model.)

*To all whom it may concern:*

Be it known that I, SIMON B. STORER, of Syracuse, in the county of Onondaga, in the State of New York, have invented new and useful Improvements in Magnetic Speed-Indicators, of which the following, taken in connection with the accompanying drawings, is a full, clear, and exact description.

This invention relates to certain improvements in magnetic speed-indicators of the class set forth in my Patent No. 680,988, dated August 20, 1901, in which a revoluble element and an oscillatory member are both movable in the field of a permanent magnet to be cut by the same lines of force, so that the drag produced by the revoluble part exerts a degree of pull upon the oscillatory member sufficient to move the latter element from its normal position of rest, the amount of movement being proportionate to the speed of rotation of the revoluble part, which speed is measured by suitable graduations on the oscillatory member. In this class of instruments the magnet is stationary and is formed with concentric annular poles, between which the revoluble parts are movable. One of these movable parts is formed of soft iron or steel and may be termed the "inductor," while the other movable part is usually made of copper or other low-resistance material, and, although the instrument is operative with either of the movable parts rotary and the other oscillatory, for convenience of description in the present application I have shown the soft-iron or steel inductor as revoluble and the low-resistance member as oscillatory. In the device shown in the patent referred to the periphery of the inductor is broken for forming a series of substantially radial teeth or pole-pieces, which serve to concentrate or bunch the magnetic lines of force which act inductively upon the oscillatory member to drag the same from its normal position of rest as the inductor is rotated. This oscillating element is made to assume a normal position of rest by means of a suitable biasing device, after which the instrument is calibrated and graduated in the usual manner; but I have discovered that a true calibration could be more easily and permanently effected if the cross-sectional form of the pole-pieces of the inductor were made variable or extensible circumferentially, so as to vary the inductive effect or drag of the field, which acts to move the oscillatory member from its normal position.

The primary object of my present invention is therefore to facilitate the calibration of the instrument by making the inductor in two parts, so that one may be adjusted circumferentially relatively to the other to vary the distribution of the lines of force of the magnet, and thereby increase or diminish the inductive effect upon the oscillatory member.

Further objects will appear in the subsequent description.

In the drawings, Figure 1 is a longitudinal vertical sectional view of a magnetic speed-indicator embodying my invention. Fig. 2 is a transverse sectional view taken on line 2 2, Fig. 1. Fig. 3 is a perspective view of the toothed inductor-rings of sections. Fig. 4 is a sectional view taken on line 4 4, Fig. 1. Fig. 5 is a view similar to Fig. 4, the cross-sectional outline of the teeth being shown in dotted lines.

Similar reference characters indicate corresponding parts in all the views.

In the drawings I have shown a cylindrical permanent magnet having inner and outer concentric pole-pieces 1 and 2 and a substantially central opening 3. Journaled within this opening upon suitable ball-bearings 4 is a revoluble element 5, of soft-iron or steel, and composed of a hub 6 and annular rings 7 and 8, both of which are mounted side by side upon the hub 6 in close contact with each other and are movable between the poles 1 and 2 of the permanent magnet, said rings being provided with peripheral projections or pole-pieces 9 and 10. One of these inductor rings or sections, as 8, is movable circumferentially relatively to the other section, so that the teeth or pole-pieces 10 are adjustable circumferentially across the gaps or spaces between the teeth of the other section for varying the cross-sectional form of the pole-pieces of the inductor. This inductor is rotated by means of a train of gears 11 and a suitable spur, which is keyed to the spindle of one of the gears and is adapted to engage the revoluble part, the speed of which is to be determined. It is thus seen that the toothed inductor 5 is rotated in the field of the permanent magnet between the poles 1 and 2 and produces a certain drag of the field proportionate to its speed of rotation. A cylindrical low-resistance element 12 is mounted to oscillate in the field of the magnet between the pole-pieces 1 and 2 and is biased to a normal position of rest by suitable counteracting springs 13, portions of the oscillating member 12 being interposed between the outer pole 2 and periphery of the inductor 5, so as to be cut by the same lines of force of the magnet as those passing through the inductor, said portions of the oscillatory member between the inductor and outer pole of the magnet being provided with a series of laterally-elongated apertures 14, which form a series of bars 15. Now it is evident that the drag produced by revolving the inductor 5 between the poles of the permanent magnet acts inductively upon the interposed portions of the oscillatory member 12 and exerts a degree of pull upon the latter member to move it from its normal position of rest, the amount of movement being proportionate to the speed of rotation of the element 5. The periphery of the oscillating member is usually provided with graduations, by means of which the degree of pull exerted thereon, and consequently the speed of revolution, is accurately measured. It will now be seen that the tufts of magnetic lines of force assume substantially the same form as the cross-sectional form of the adjacent sections of each tooth of the inductor and that the induced current set up by the lines of force through each pole-piece or tooth of the inductor would travel transversely in a course substantially coincident with the outline of the cross-section of the combined toothed sections, as indicated by dotted lines in Fig. 5, were it not for the openings 14 in the low-resistance member 12, in which it will be observed that the induced current in the member 12 follows the course of least resistance, which is through the bars 15 nearest to the front and rear edges of the teeth of the inductor, and these openings or bars being substantially parallel it is evident that the course of the current will be in substantially rectangular paths, inclosing a greater area in the low-resistance conductor than would be possible if the cylindrical wall between the periphery of the inductor and outer pole of the magnet were continuous. This adds materially to the drag efficiency upon the oscillatory member, and by adjusting the movable inductor-ring relatively to the other the circumferential length of the teeth or pole-pieces of the inductor may be extended to entirely cover the gaps of the other inductor-section, so that the distribution of the lines of force is substantially uniform, and therefore the inductive effect or pull upon the oscillatory member is reduced to a minimum, while, on the other hand, by adjusting the movable inductor-rim circumferentially, so as to gradually uncover the space between the teeth of the ring-sections, the current is gradually increased, and therefore the inductive effect upon the oscillatory member is also increased. It becomes apparent now that if for any reason the initial calibration of the instrument proves inaccurate in its reading such inaccuracy may be compensated by shifting the position of the movable inductor-ring relatively to the other in the manner described to vary the inductive effect upon the oscillatory member. In order to accomplish this adjustment, I provide the hub 6 with an annular flange 16, through which is inserted one or more screws 17, which pass through a slot 18 in the adjacent ring 10 into threaded apertures 19 in the ring 9, the screws serving to lock the inductor-rings firmly to the hub and at the same time permitting the ring 10 to be adjusted circumferentially when desired.

Having thus described my invention, what I claim, and desire to secure by Letters Patent, is—

1. In a magnetic speed-indicator, a two-part inductor, one of the parts being adjustable relatively to the other to facilitate calibration of the instrument.

2. In a magnetic speed-indicator, a two-part inductor, one of the parts being adjustable circumferentially relatively to the other to vary the distribution of the lines of force of the magnet.

3. In a magnetic speed-indicator, two toothed inductor-sections, one being adjustable relatively to the other to vary the cross-sectional form of the teeth.

4. In combination with a magnet, a two-part inductor, one of the parts being adjustable relatively to the other and a low-resistance part, one of the two latter elements being rotatable with reference to the other.

5. In combination with a magnet, a sectional inductor rotatable in the field of the magnet, one of the sections being adjustable relatively to the other to vary the form of the induction-teeth or poles, and an oscillatory member actuated by the drag of the field.

6. In combination with a magnet, an inductor rotatable in the field of the magnet and provided with sectional teeth or poles, one of the sections of each tooth being adjustable circumferentially relatively to the other to vary the form of the tooth, and an apertured conductor actuated by the drag of the field.

7. In combination with a magnet, two iron parts in contact and rotatable in the field of the magnet, each part having substantially radial arms, one of the parts being adjustable circumferentially relatively to the other, and an apertured conductor adapted to oscillate between the ends of the arms and magnet and actuated by the drag of the field.

In witness whereof I have hereunto set my hand this 31st day of March, 1903.

SIMON B. STORER.

Witnesses:
H. E. CHASE,
MILDRED M. NOTT.